United States Patent
Patel et al.

(10) Patent No.: US 6,942,954 B2
(45) Date of Patent: Sep. 13, 2005

(54) TONER PROCESSES

(75) Inventors: Raj D. Patel, Oakville (CA); Michael A. Hopper, Toronto (CA); Edward G. Zwartz, Mississauga (CA); Cuong Vong, Hamilton (CA); Allan K. Chen, Oakville (CA)

(73) Assignee: Xerox Corporation, Stamford, CT (US)

( * ) Notice: Subject to any disclaimer, the term of this patent is extended or adjusted under 35 U.S.C. 154(b) by 156 days.

(21) Appl. No.: 10/606,330

(22) Filed: Jun. 25, 2003

(65) Prior Publication Data

US 2004/0265728 A1 Dec. 30, 2004

(51) Int. Cl.[7] .............................................. G03G 9/08
(52) U.S. Cl. ........................ 430/137.1; 430/137.14; 523/335
(58) Field of Search .................. 430/137.1, 137.14; 523/335

(56) References Cited

U.S. PATENT DOCUMENTS

| | | | |
|---|---|---|---|
| 3,998,160 A | 12/1976 | Pearce | 101/426 |
| 4,128,202 A | 12/1978 | Buros | 235/493 |
| 4,517,268 A | 5/1985 | Gruber et al. | 430/39 |
| 4,859,550 A | 8/1989 | Gruber et al. | 430/39 |
| 5,034,298 A | 7/1991 | Berkes et al. | 430/110 |
| 5,290,654 A | 3/1994 | Sacripante et al. | 430/137 |
| 5,510,221 A | 4/1996 | Matalevich et al. | 430/106.6 |
| 5,780,190 A | 7/1998 | Listigovers et al. | 430/39 |
| 5,910,387 A | 6/1999 | Mychajlowskij et al. | 430/110 |
| 5,914,209 A | 6/1999 | Grushkin | 430/106.6 |
| 5,916,725 A | 6/1999 | Patel et al. | 430/137 |
| 5,919,595 A | 7/1999 | Mychajlowskij et al. | 430/137 |
| 5,922,501 A | 7/1999 | Cheng et al. | 430/137 |
| 5,925,488 A | 7/1999 | Patel et al. | 430/137 |
| 5,945,245 A | 8/1999 | Mychajlowskij et al. | 430/137 |
| 5,977,210 A | 11/1999 | Patel et al. | 523/161 |
| 6,132,924 A | 10/2000 | Patel et al. | 430/137 |
| 6,268,102 B1 | 7/2001 | Hopper et al. | 430/137.14 |
| 6,416,920 B1 | 7/2002 | Hopper et al. | 430/137.14 |
| 6,495,302 B1 | 12/2002 | Jiang et al. | 430/137.14 |
| 6,500,597 B1 | 12/2002 | Patel et al. | 430/137.14 |
| 6,541,175 B1 | 4/2003 | Jiang et al. | 430/137.14 |
| 6,576,389 B2 | 6/2003 | Vanbesien et al. | 430/137.14 |
| 6,656,658 B2 * | 12/2003 | Patel et al. | 430/137.14 |
| 6,767,684 B1 * | 7/2004 | Patel et al. | 430/137.14 |

OTHER PUBLICATIONS

Copending U.S. Appl. No. 10/354,228, filed Jan. 29, 2003, on "Toner Processes" by Raj D. Patel et al.
Copending U.S. Appl. No. 10/106,519, filed Mar. 25, 2002, on "Toner Processes" by Raj D. Patel et al.
Copending U.S. Appl. No. 10/106,514, filed Mar. 25, 2002, on "Toner Processes" by Raj D. Patel et al.
Copending U.S. Appl. No. 10/106,473, filed Mar. 25, 2002, on "Toner Processes" by Raj D. Patel et al.
Copending U.S. Appl. No. 10/106,512, filed Mar. 25, 2002, on "Magnetite Toner Processes" by Raj D. Patel et al.

* cited by examiner

*Primary Examiner*—John L Goodrow
(74) *Attorney, Agent, or Firm*—E. D. Palazzo

(57) ABSTRACT

A toner process involving the heating a mixture of an acicular magnetite dispersion, a colorant dispersion, a wax dispersion, a first latex containing a crosslinked resin, and a second latex containing a resin free of crosslinking in the presence of a coagulant to provide aggregates, stabilizing the aggregates with a silicate salt dissolved in a base, and further heating the aggregates to provide coalesced toner particles.

34 Claims, No Drawings

TONER PROCESSES

COPENDING APPLICATIONS AND RELATED PATENTS

Illustrated in copending application U.S. Ser. No. 10/606, 298, filed concurrently herewith, the disclosure of which is totally incorporated herein by reference, is a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein said first heating is below about the latex polymer glass transition temperature (Tg), and said second heating is about above the latex polymer glass transition temperature.

Illustrated in copending application U.S. Ser. No. 10/603, 449. Publication No. 2004/0265727, filed concurrently herewith, the disclosure of which is totally incorporated herein by reference, is a toner process comprised of a first heating of a colorant dispersion, a latex emulsion, and a wax dispersion in the presence of a coagulant containing a metal ion; adding a silicate salt; followed by a second heating.

Illustrated in copending application U.S. Ser. No. 10/603, 321, Publication No. 2004/0265729, filed concurrently herewith, the disclosure of which is totally incorporated herein by reference, is a toner process comprised of heating a mixture of an acicular magnetite dispersion, a colorant dispersion, a wax dispersion, a first latex containing a crosslinked resin, a second latex containing a resin substantially free of crosslinking, a coagulant and a silica, and wherein the toner resulting possesses a shape factor of from about 120 to about 150.

Illustrated in U.S. Pat. No. 6,617,092 filed Mar. 25, 2002, the disclosure of which is totally incorporated herein by reference, is a process for the preparation of a magnetic toner comprising heating a colorant dispersion containing acicular magnetite, a carbon black dispersion, a latex emulsion, and a wax dispersion.

Illustrated in U.S. Pat. No. 6,627,373 filed Mar. 25, 2002, the disclosure of which is totally incorporated herein by reference, is a process for the preparation of a magnetic toner comprising the heating of a colorant dispersion comprised of a magnetite dispersion, and a carbon black dispersion, and thereafter mixing with a basic cationic latex emulsion and a wax dispersion.

Illustrated in U.S. Pat. No. 6,541,175, filed Feb. 4, 2002 on Toner Processes, the disclosure of which is totally incorporated herein by reference, is a process comprising:

(i) providing or generating an emulsion latex comprised of sodio sulfonated polyester resin particles by heating the particles in water at a temperature of from about 65° C. to about 90° C.;

(ii) adding with shearing to the latex (i) a colorant dispersion comprising from about 20 percent to about 50 percent of a predispersed colorant in water, followed by the addition of an organic or an inorganic acid;

(iii) heating the resulting mixture at a temperature of from about 45° C. to about 65° C. followed by the addition of a water insoluble metal salt or a water insoluble metal oxide thereby releasing metal ions and permitting aggregation and coalescence, optionally resulting in toner particles of from about 2 to about 25 microns in volume average diameter; and optionally (iv) cooling the mixture and isolating the product.

Illustrated in copending application U.S. Ser. No. 10/106, 473, Publication No. 2003/0180648, on Toner Processes, filed Mar. 25, 2002, the disclosure of which is totally incorporated herein by reference, is a process for the preparation of a toner comprising mixing a colorant dispersion comprising an acicular magnetite dispersion and a carbon black dispersion with a latex, a wax dispersion and a coagulant.

Illustrated in U.S. Pat. No. 6,656,658 filed Mar. 25, 2002 on Magnetite Toner Processes, the disclosure of which is totally incorporated herein by reference, is a toner process comprising heating a mixture of an acidified dispersion of an acicular magnetite with a colorant dispersion of carbon black, a wax dispersion, and an acidic latex emulsion.

Illustrated in U.S. Pat. No. 6,656,657 filed Mar. 25, 2002 on Toner Processes, the disclosure of which is totally incorporated herein by reference, is a toner process comprising heating an acidified dispersion of an acicular magnetite with an anionic latex, an anionic carbon black dispersion, and an anionic wax dispersion.

Illustrated in U.S. Pat. No. 6,495,302, filed Jun. 11, 2001 on Toner Coagulant Processes, the disclosure of which is totally incorporated herein by reference, is a process for the preparation of toner comprising (i) generating a latex emulsion of resin, water, and an ionic surfactant, and a colorant dispersion of a colorant, water, an ionic surfactant, or a nonionic surfactant, and wherein (ii) the latex emulsion is blended with the colorant dispersion;

(iii) adding to the resulting blend containing the latex and colorant a coagulant of a polyaluminum chloride with an opposite charge to that of the ionic surfactant latex colorant;

(iv) heating the resulting mixture below or equal to about the glass transition temperature (Tg) of the latex resin to form aggregates;

(v) optionally adding a second latex comprised of submicron resin particles suspended in an aqueous phase (iv) resulting in a shell or coating wherein the shell is optionally of from about 0.1 to about 1 micron in thickness, and wherein optionally the shell coating is contained on 100 percent of the aggregates;

(vi) adding an organic water soluble or water insoluble chelating component to the aggregates of (v) particles, followed by adding a base to change the resulting toner aggregate mixture from a pH which is initially from about 1.9 to about 3 to a pH of about 5 to about 9;

(vii) heating the resulting aggregate suspension of (vi) above about the Tg of the latex resin;

(viii) optionally retaining the mixture (vii) at a temperature of from about 70° C. to about 95° C.;

(ix) changing the pH of the (viii) mixture by the addition of an acid to arrive at a pH of about 1.7 to about 4; and (x) optionally isolating the toner.

Illustrated in U.S. Pat. No. 6,500,597, filed Aug. 6, 2001 on Toner Coagulant Processes, the disclosure of which is totally incorporated herein by reference, is a process comprising (i) blending a colorant dispersion of a colorant, water, and an anionic surfactant, or a nonionic surfactant with (ii) a latex emulsion comprised of resin, water, and an ionic surfactant;

(iii) adding to the resulting blend a first coagulant of polyaluminum sulfosilicate (PASS) and a second cationic co-coagulant having an opposite charge polarity to that of the latex surfactant;

(iv) heating the resulting mixture below about the glass transition temperature (Tg) of the latex resin;

(v) adjusting with a base the pH of the resulting toner aggregate mixture from a pH which is in the range of about 1.8 to about 3 to a pH range of about 5 to about 9;

(vi) heating above about the Tg of the latex resin;

(vii) changing the pH of the mixture by the addition of a metal salt to arrive at a pH of from about 2.8 to about 5; and (viii) optionally isolating the product.

Illustrated in U.S. Pat. No. 6,576,389, filed Oct. 15, 2001 on Toner Coagulant Processes, the disclosure of which is totally incorporated herein by reference, is a process for the preparation of toner comprising mixing a colorant dispersion, a latex emulsion, a wax dispersion and coagulants comprising a colloidal alumina coated silica, and a polymetal halide.

Illustrated in U.S. Pat. No. 6,767,684 filed Jan. 29, 2003, the disclosure of which is totally incorporated herein by reference, is a toner process comprising mixing a colorant dispersion comprising an acicular magnetite dispersion and a colorant with a latex containing a crosslinked resin, a latex containing a resin tree of crosslinking, a wax dispersion, a resin, and a coagulant.

The appropriate components, such as for example, magnetites, waxes, coagulants, resin latexes, surfactants, and colorants, and processes of the above copending applications may be selected for the present invention in embodiments thereof.

BACKGROUND

This invention relates to toner processes, and more specifically, to aggregation and coalescence processes. More specifically, the present invention relates in embodiments to methods for the preparation of toner compositions by a chemical process, such as emulsion/aggregation/coalescence, wherein latex particles are aggregated with a wax and a crosslinked gel wherein the gel or crosslinking value is, for example, from about 20 to about 55 percent as measured gravimetrically; colorants, and a magnetite in the presence of a coagulant like a polymetal halide, or alternatively a mixture of coagulants or flocculating agents; thereafter stabilizing the aggregates with a solution of a silicate like sodium silicate dissolved in a base, such as sodium hydroxide, and thereafter coalescing or fusing by heating the mixture above the resin Tg to provide toner size particles which when developed by an electrographic process generates documents suitable for magnetic image character.

A number of advantages are associated with the present invention in embodiments thereof including, for example, excellent toner hot offset, for example above about 210° C., and more specifically, from about 210° C. to about 230° C.; a toner fusing latitude of from about 20° C. to about 35° C. wherein fusing latitude refers to a temperature in which, when a developed image is fused, evidences substantially no offset either to the substrate that the image is fused on, referred to as "Cold" offset or an offset on the fuser roll referred to as the "HOT" offset; a minimum fixing temperature of, for example, about 170° C. to about 195° C.; and extended photoreceptor life since the toner fusing temperature can be below about 195° C., such as from about 175° C. to about 190° C.; and also in embodiments a process that enables a means of identifying how a toner was fabricated by, for example, analyzing for aluminum and silica content.

REFERENCES

In U.S. Pat. No. 6,132,924, the disclosure of which is totally incorporated herein by reference, there is illustrated a process for the preparation of toner comprising mixing a colorant, a latex, and a coagulant, followed by aggregation and coalescence, wherein the coagulant may be a polyaluminum chloride.

In U.S. Pat. No. 6,268,102, the disclosure of which is totally incorporated herein by reference, there is illustrated a process for the preparation of toner comprising mixing a colorant, a latex, and a coagulant, followed by aggregation and coalescence, wherein the coagulant may be a polyaluminum sulfosilicate.

Also, in U.S. Pat. No. 6,416,920, the disclosure of which is totally incorporated herein by reference, there is illustrated a process for the preparation of toner comprising mixing a colorant, a latex, and a silica, which silica is coated with an alumina.

Magnetic ink printing methods with inks containing magnetic particles are known. For example, there is disclosed in U.S. Pat. No. 3,998,160, the disclosure of which is totally incorporated herein by reference, that various magnetic inks have been used in printing digits, characters, or artistic designs on checks or bank notes. The magnetic ink used for these processes can contain, for example, magnetic particles, such as a magnetite in a fluid medium, and a magnetic coating of ferric oxide, chromium dioxide, or similar materials dispersed in a vehicle comprising binders, and plasticizers.

Disclosed in U.S. Pat. No. 4,128,202, the disclosure of which is totally incorporated herein by reference, is a device for transporting a document that has been mutilated or erroneously encoded, and wherein there is provided a predetermined area for the receipt of correctly encoded magnetic image character recognition information (MICR). As indicated in this patent, the information is referred to as MICR characters, which characters can appear, for example, at the bottom of personal checks as printed numbers and symbols. These checks have been printed in an ink containing magnetizable particles therein, and when the information contained on the document is to be read, the document is passed through a sorter/reader which first magnetizes the magnetizable particles, and subsequently detects a magnetic field of the symbols resulting from the magnetic retentivity of the ink. The characters and symbols involved, according to the '202 patent, are generally segregated into three separate fields, the first field being termed a transient field, which contains the appropriate symbols and characters to identify the bank, bank branch, or the issuing source.

In U.S. Pat. No. 5,914,209, the disclosure of which is totally incorporated by reference, there is illustrated a process for preparing MICR toners using a combination of hard and soft magnetites, and a lubricating wax and melt mixing with a resin followed by jetting and classifying the blend to provide toner compositions.

In U.S. Pat. No. 4,517,268, the disclosure of which is totally incorporated by reference, there is illustrated a process for preparing MICR toners using styrene copolymers, such as styrene butadiene, by melt mixing in a Banbury apparatus, followed by pulverizing the magnetite and the resin, followed by jetting and classifying to provide, for example, 10 to 12 micron toner size particles which when mixed with an additive package and a carrier provides a developer suitable for use in the Xerox Corporation 9700®.

Further patents relating to MICR processes are U.S. Pat. Nos. 4,859,550; 5,510,221; and 5,034,298, illustrating, for example, the generation of MICR toners by conventional means such as that described in U.S. Pat. No. 4,517,268.

In applications requiring MICR capabilities, the toners selected usually contain magnetites having specific properties, an important one of which is a high enough level of remanence or retentivity. Retentivity is a measure of the magnetism left when the magnetite is removed from the magnetic field, that is, the residual magnetism. Also of value are toners with a high enough retentivity, such that when the characters are read, the magnetites produce a signal strength of equal to greater than about 100 percent. The signal level can vary in proportion to the amount of toner deposited on the document being generated, and signal strength of a toner composition can be measured by using known devices, including the MICR-Mate 1, manufactured by Checkmate Electronics, Inc.

In U.S. Pat. No. 5,780,190, the disclosure of which is totally incorporated herein by reference, there is disclosed an ionographic process which comprises the generation of a latent image comprised of characters; developing the image with an encapsulated magnetic toner comprised of a core comprised of a polymer and a soft magnetite, and wherein the core is encapsulated within a polymeric shell; and subsequently providing the developed image with magnetic ink characters thereon to a reader/sorter device.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256 and 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488 and 5,977,210. The components and processes of these Xerox patents can be selected for the present invention in embodiments thereof.

In addition, the following U.S. Patents relate to emulsion aggregation toner processes, the disclosures of which are totally incorporated herein by reference.

U.S. Pat. No. 5,922,501, the disclosure of which is totally incorporated herein by reference, illustrates a process for the preparation of toner comprising blending an aqueous colorant dispersion and a latex resin emulsion, and which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat. No. 5,945,245, the disclosure of which is totally incorporated herein by reference, illustrates a surfactant free process for the preparation of toner comprising heating a mixture of an emulsion latex, a colorant, and an organic complexing agent.

SUMMARY

It is a feature of the present invention to provide a toner with a number of the advantages illustrated herein, and more specifically, a silica coated magnetite containing toner for Magnetic Ink Character Recognition (MICR) processes by, for example, selecting specific magnetites that provide an acceptable readability signal by a check reader, and wherein the resulting toners possess a sufficient magnetic signal, desirable melt fusing, hot offset, and fusing latitude temperatures, and which toners also contain a gel or a crosslinked resin.

In another feature of the present invention, there is provided a process for the preparation of a MICR toner, wherein resins, pigment and wax are aggregated in the presence of a coagulant, such as polymetal halides or polymetal sulfosilicates, to provide toner size aggregates which can then be stabilized, for example with substantially no increase in size, by introducing a silicate salt in the presence of a base and further heating to provide toners with narrow particle size distribution.

Aspects of the present invention relate to a toner process comprised of heating a mixture of an acicular magnetite dispersion, a colorant dispersion, a wax dispersion, a first latex containing a crosslinked resin, and a second latex containing a resin substantially free of or free of crosslinking in the presence of a coagulant to provide aggregates, stabilizing the aggregates with a silicate salt dissolved in a base, and further heating the aggregates to provide coalesced toner particles; a process comprising (i) mixing the acicular magnetite dispersion containing water and an anionic surfactant, and the colorant dispersion containing carbon black, water, and an anionic surfactant, and optionally a nonionic surfactant, and wherein the wax dispersion is comprised of submicron wax particles of from about 0.1 to about 0.5 micron in diameter by volume, and which wax is dispersed in water and contains an anionic surfactant to provide a mixture containing magnetite, colorant, and a wax;

(ii) wherein the resulting mixture is blended with the first and a second latex, the first latex comprising submicron noncrosslinked resin particles of about 150 to about 300 nanometers in diameter containing water, an anionic surfactant or a nonionic surfactant, and wherein the second latex comprises submicron crosslinked gel particles of about 30 to about 150 nanometers in diameter, and containing water and an anionic surfactant or a nonionic surfactant;

(iii) wherein the resulting blend of (ii) possesses a pH of about 2.2 to about 2.8, and to which is added a coagulant to initiate flocculation or aggregation of the resulting components;

(iv) heating the resulting mixture of (iii) below about the glass transition temperature (Tg) of the resin free of crosslinking to form aggregates;

(v) adding to the formed aggregates a latex comprised of a noncrosslinked resin suspended in an aqueous phase containing an ionic surfactant and water;

(vi) adding to the resulting mixture of (v) an aqueous solution of a silicate salt dissolved in a base to thereby change the pH, which is initially from about 2 to about 2.8, to arrive at a pH of from about 7 to about 7.4 resulting in a coating of silica on the aggregate particles containing magnetite;

(vii) heating the resulting mixture of (vi) above about the Tg of the noncrosslinked resin of (i) and allowing the pH to decrease;

(viii) retaining the mixture of (vii) at a temperature of from about 85° C. to about 95° C. for an optional period of about 10 to about 60 minutes, followed by a pH reduction with an acid to arrive at a pH of from about 4.2 to about 4.8, which pH is below about the Pzc of the magnetite particles wherein the Pzc is the pH of the mixture particles when the particles are free of a positive or a negative charge, and optionally wherein an increase in temperature results in a decreased Pzc value;

(ix) retaining the mixture temperature at from about 85° C. to about 95° C. for an optional period of about 5 to about 10 hours to assist in permitting the fusion or coalescence of the toner aggregates and to obtain smooth particles;

(x) washing the resulting toner slurry;

(xi) isolating the formed toner particles, and drying; a toner process comprised of heating a mixture of an acicular magnetite dispersion, a colorant dispersion, a first latex containing a crosslinked resin, and a second latex containing a resin free of crosslinking, in the presence of a coagulant to provide aggregates, stabilizing the aggregates with a silicate salt dissolved in a base, and further heating the aggregates to provide coalesced toner particles; a process comprising heating a mixture of magnetite, colorant, a first latex, and a second latex wherein the first latex contains a crosslinked polymer and the second latex is substantially free of a crosslinked polymer, and which heating is accomplished in the presence of a coagulant and a silicate salt base mixture, and wherein the heating comprises a first and second heating, which second heating is at a higher temperature than the first heating, and wherein the first heating is below about the glass transition temperature (Tg) of the polymer free of crosslinking resin, and the second heating is above about the Tg of the resin free of crosslinking; the preparation of MICR toners wherein the toner comprises magnetite, resin wax, silica and crosslinked gel particles wherein the silica is introduced in the form of a silicate salt dissolved in sodium hydroxide, and which solution possesses a pH of about 12, and wherein silica binds or coats the magnetite or the aggregate particles containing the magnetite thereby allowing the pH during coalescence to be lowered below the Point of Zero Charge of the uncoated magnetite, for example equal to or less than about 5; a process wherein the coating of silica on the magnetite particles lowers the Pzc from a value of about 5.4 to about 3.5 enabling the pH during coalescence to be reduced to about 4 to about 5 without any toner size increase, thereby providing a broader process latitude and more rapid coalescence, which coalescence can be reduced by about 40 percent; a toner process wherein there is selected a silica in the form of a silicate salt present on oxide particles such as titanium, aluminum, zirconium and in particular magnetite which exhibit dual charge capabilities depending on the pH of the surrounding media, allowing these particles to function as coagulating/flocculating agents for an anionic or a cationic process, and wherein the addition of the silicate salt forms a coating of silica on the magnetite aggregates thereby reducing or lowering the Pzc, for example from about 5.3 to about 3.5; a toner process wherein the toner formed can be of various shapes, such as a potato like shape to spherical shape by, for example, reducing the pH during coalescence below a pH of 5; a MICR toner containing the in situ incorporation of silica wherein the silica is introduced in the form of a silicate salt, which is dissolved in a base; a MICR toner containing silica and prepared by emulsion aggregation processes wherein the magnetite is in the form of needle shape or acicular magnetite particles, which are of a size diameter of, for example, from about 450 nanometers to about 700 nanometers; a toner process involving the silica incorporation by the introduction of an aqueous solution of a silicate salt dissolved in a base, which base is introduced into an aggregate mixture prior to increasing the temperature of the aggregate particles above the resin Tg to achieve coalescence or fusion; a toner process that is capable of incorporating into toners needle shape or acicular magnetites, which have a coercivity of about 350 oersteds (Oe), which is about 2 to about 3 times that of cubic or spherical magnetite, which have a coercivity of about 110 oersteds, to provide an adequate magnetic signal, for example greater then 100 percent, where 100 percent refers, for example, to the nominal signal for readability by a check reader; and the preparation of a MICR toner by emulsion aggregation processes wherein the amount of acicular magnetite loading is about 23 to about 35 weight percent of toner, or about 45 to about 65 weight percent to provide an adequate magnetic signal for readability by a check reader; a process wherein (i) the acicular magnetite dispersion contains water and an anionic surfactant, or a nonionic surfactant, the colorant dispersion of carbon black contains water and an anionic surfactant, or a nonionic surfactant, and the wax dispersion is comprised of submicron wax particles of from about 0.1 to about 0.5 micron in diameter by volume, and which wax is dispersed in water and an anionic surfactant to provide a mixture containing magnetite, colorant, and a wax;

(ii) wherein the mixture of (i) is blended with a latex emulsion comprised of submicron noncrosslinked resin particles in the size diameter range of about 150 to about 300 nanometers, and containing water, an anionic surfactant or a nonionic surfactant, and a second latex comprised of submicron crosslinked gel particles in the size diameter range of about 30 to about 150 nanometers containing water and an anionic surfactant or a nonionic surfactant to provide a blend of magnetite, colorant, wax and resins;

(iii) wherein the resulting blend possesses a pH of about 2.2 to about 2.8 to which is added a coagulant, such as a polymetal halide, to initiate flocculation or aggregation of the blend components;

(iv) heating the resulting mixture of (iii) below about the glass transition temperature (Tg) of the latex resin to form toner sized aggregates;

(v) adding to the formed toner aggregates a latex comprised of a noncrosslinked resin suspended in an aqueous phase containing an ionic surfactant and water, and stirring for a period of time to permit stabilization of the aggregate particle size;

(vi) adding to the resulting mixture of (v) an aqueous solution of a silicate salt dissolved in a base to thereby change the pH, which is initially from about 2 to about 2.8, to arrive at a pH of from about 7 to about 7.4, and allowing the mixture to stir for a period of about 5 to about 10 minutes to provide a coating of silica on the aggregate particles containing magnetite;

(vii) heating the resulting aggregate mixture of (vi) above about the Tg of the latex containing the noncrosslinked resin of (i);

(viii) retaining the mixture temperature at from about 85° C. to about 95° C. for an optional period of about 10 to about 60 minutes, followed by a pH reduction with an acid to arrive at a, pH of about 4.2 to about 4.8, which pH is usually below the Pzc of the magnetite particles;

(ix) retaining the mixture temperature at from about 85° C. to about 95° C. for a period of about 5 to about 10 hours to assist in permitting the fusion or coalescence of the toner aggregates and to obtain smooth particles;

(x) washing the resulting toner slurry;

(xi) isolating the toner and drying; a process for the preparation of a MICR toner composition, which when analyzed for aluminum and silica contents contains about 70 to about 95, percent of both thereby providing a means of detection of how the toner was fabricated; a toner composition comprised of magnetite, a noncrosslinked latex, a crosslinked latex, wax, carbon black and a silica which is incorporated during particle fabrication as a coating rather than an external additive; a process wherein the magnetite dispersion contains an anionic surfactant and a nonionic surfactant wherever the dispersion possesses a pH of from about 6.5 to about 6.8; a process wherein the carbon black dispersion comprises particles dispersed in water and an anionic surfactant, and which dispersion possesses a pH of about 6.3 to about 6.8; a, process wherein the wax dispersion comprises particles dispersed in water and an ionic surfactant; a process wherein the acicular magnetite is present in an amount of from about 20 to about 35 percent by weight of toner, and preferably in an amount of from about 23 to about 32 percent by weight of toner; a process wherein the acicular magnetite utilized exhibits a coercivity of from about 250 to about 700 Oe; a process wherein the acicular magnetite has a particle size of about 0.6 micron in length by 0.1 micron in diameter, and is comprised of about 21 percent FeO and about 79 percent $Fe_2O_3$; a process wherein the toner exhibits a magnetic signal of from about 115 to about 150 percent of the nominal signal; a process wherein the toner possesses a minimum fix temperature (MFT) of about 170° C. to about 190° C.; a process wherein the toner hot offset temperature (HOT) is in excess of about 210° C.; a process wherein the magnetite dispersion is obtained by a ball milling, attrition, polytroning or media milling resulting in magnetite particles dispersed in water containing an anionic surfactant; a process wherein the carbon black dispersion is present in an amount of about 4 to about 8 percent by weight of toner; a process wherein the latex resin particles are from about 0.15 to about 0.3 micron in volume average diameter; a process wherein the magnetite is of a size of about 0.6 micron to about 0.1 micron, and the carbon black is of a size of about 0.01 to about 0.2 micron in average volume diameter; a process wherein the acid is selected from the group consisting of nitric, sulfuric, hydrochloric, citric and acetic acid; a process wherein the base is selected in the form of a silicate salt dissolved in the base which silicate is selected from a group of sodium silicate or potassium silicate or magnesium sulfate silicate; a process wherein the addition of the silicate salt dissolved in the base is added to the toner size aggregates, which provides a coating of silica on the aggregates containing the magnetite or the iron oxide particles, rendering it substantially nonreactive, thus a toner process wherein the addition of a basic silicate salt provides a method to stabilize the toner size aggregates from further growth during coalescence, or when the temperature of the aggregate mixture is raised above the resin Tg; a process wherein there is added to the formed toner size aggregates a latex comprised of noncrosslinked submicron resin particles suspended in an aqueous phase containing an anionic surfactant, and wherein the noncrosslinked latex is selected in an amount of from about 10 to about 40 percent by weight of the initial latex to form a shell on the formed aggregates, and which shell is of a thickness of, for example, about 0.2 to about 0.8 micron; a process wherein the added latex contains the same resin as the initial latex of (i), or wherein the added latex contains a dissimilar resin than that of the initial latex; a process wherein the pH of the mixture resulting in (vi) is increased from about 2 to about 2.6 to about 7 to about 7.5 with the addition of sodium silicate dissolved in sodium hydroxide, which addition components function as a stabilizer for the aggregates when the temperature of the coalescence (vi) is raised above the resin Tg; a process wherein the addition of a basic sodium silicate provides a reaction with iron oxide or magnetite, thereby allowing the pH during coalescence (viii) to be reduced to less than 5 to provide MICR toners; a process wherein the temperature at which toner sized aggregates are formed controls the size of the aggregates, and wherein the final toner size is from about 5 to about 12 microns in volume average diameter; a process wherein the aggregation (iv) temperature is from about 45° C. to about 60° C., and wherein the coalescence or fusion temperature of, for example, (vii) and (viii) is from about 85° C. to about 95° C.; a process wherein the time of coalescence or fusion is from about 5 to about 10 hours, and wherein there are provided toner particles with a smooth morphology; a process wherein the latex contains a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly (styrene-alkyl acrylate-acrylonitrile-acrylic acid), poly (styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly (styrene-butyl acrylate-acrylononitrile-acrylic acid); a process for the preparation of a MICR toner comprising mixing (i) an acicular magnetite dispersion containing water and an anionic surfactant, and a colorant dispersion of carbon black containing water, an anionic surfactant, and a wax dispersion;

(ii) wherein the mixture of (i) is blended with a latex emulsion comprised of submicron noncrosslinked resin particles in the size range of about 150 to about 275 nanometers and containing water, an anionic surfactant or a nonionic surfactant, and a second latex comprised of submicron crosslinked polymer particles in the size range of about 30 to about 150 nanometers and containing water and an anionic surfactant or a nonionic surfactant;

(iii) wherein the resulting blend possesses a pH of about 2.4 to about 2.7, and there is added a cationic coagulant of a polyaluminum chloride to initiate flocculation or aggregation of the components of (i) and (ii);

(iv) heating the resulting mixture of (iii) below the glass transition temperature (Tg) of the crosslinked resin latex to form toner sized aggregates;

(v) adding to the formed toner aggregates a third latex comprised of a resin suspended in an aqueous phase containing an ionic surfactant and water, and stirring for a period of time to permit stabilization of the aggregate particle size;

(vi) adding to the resulting mixture of (v) an aqueous solution of a sodium silicate dissolved in sodium hydroxide to thereby change the pH, which is initially from about 2 to about 2.8, to arrive at a pH of from about 7 to about 7.4, and allowing the mixture to stir for a period of about 5 to about 15 minutes causing the silica to react with the magnetite particles;

(vii) heating the resulting aggregate suspension of (vi) above the Tg of the latex noncrosslinked resin of (i);

(viii) retaining the mixture temperature at from about 80° C. to about 95° C. for a period of about 10 to about 75 minutes, followed by a pH reduction with an acid to arrive at a pH of about 4.2 to about 4.8;

(ix) retaining the mixture temperature at from about 80° C. to about 95° C. for a period of about 5 to about 8 hours to assist in permitting the fusion or coalescence of the toner aggregates and to obtain smooth toner particles;

(x) washing the resulting toner slurry;

(xi) isolating the toner particles and drying in an oven;

(i) a toner process wherein there is selected a latex, a magnetite dispersion that contains water and an anionic surfactant, a colorant dispersion which contains carbon black water and an anionic surfactant, and a wax dispersion comprised of submicron wax particles of from about 0.1 to about 0.9 micron in diameter by volume, and which wax is dispersed in an anionic surfactant;

(ii) wherein the latex is comprised of two latex emulsions, a noncrosslinked latex and a crosslinked latex, and wherein each of the latexes contain resin particles, water and an anionic surfactant;

(iii) adding to the resulting mixture with a pH of about 2 to about 3 a coagulant, and which coagulant is a polymetal halide, a cationic surfactant, or mixtures thereof to primarily enable flocculation of the resin latexes, the magnetite, the colorant, and the wax;

(iv) heating the resulting mixture below about the glass transition temperature (Tg) of the latex resin to form toner sized aggregates;

(v) adding to the formed toner aggregates a latex comprised of noncrosslinked resin suspended in an aqueous phase containing an ionic surfactant and water;

(vi) adding to the resulting mixture of (v) an aqueous solution of a silicate dissolved in sodium hydroxide to thereby change the pH from an initial about 2 to about 2.9 to a pH of from about 7 to about 8;

(vii) heating the resulting aggregate suspension of (vi) to above the Tg of the latex resin of (i); (viii) optionally retaining the mixture temperature at from about 70° C. to about 95° C. optionally for a period of about 25 to about 60 minutes, followed by a pH reduction with an acid to arrive at a pH of about 4 to about 5 to assist in permitting the fusion or coalescence of the toner aggregates;

(ix) further retaining the mixture temperature at from about 85° C. to about 95° C. for an optional period of about 4 to about 10 hours to assist in permitting the fusion or coalescence of the toner aggregates to obtain smooth particles; and (x) washing the resulting toner slurry; and isolating the toner; a process wherein the colorant dispersion contains an anionic surfactant; a process wherein the colorant is carbon black, and wherein the carbon black dispersion comprises carbon black particles dispersed in water and an anionic surfactant, and wherein the colorant is present in an amount of from about 4 to about 10 weight percent; a process wherein the amount of acicular magnetite selected is from about 20 to about 40 percent by weight of toner, and the coagulant is comprised of a first coagulant of a polymetal halide present in an amount of about 0.02 to about 2 percent by weight of toner, and a further second cationic surfactant coagulant present in an amount of about 0.1 to about 5 percent by weight of toner; a process wherein the amount of acicular magnetite selected is from about 23 to about 35 percent by weight of toner, and the amount of coagulant, which coagulant is a polymetal halide, is selected in an amount of about 0.05 to about 0.15 percent by weight of toner; a process wherein the acicular magnetite utilized exhibits a coercivity of from about 250 to about 700 Oe; a process wherein the acicular magnetite possesses a coercivity of from about 250 to about 500 Oe, a remanent magnetization (Br) of about 23 to about 39 emu/gram, and a saturation magnetization (Bm) of about 70 to about 90 emu/gram; a process wherein the toner exhibits a magnetic signal of about 90 to about 150 percent of the nominal where the nominal is a signal strength of about 100 percent; a process wherein the toner possesses a minimum fix temperature (MFT) of about 170° C. to about 195° C.; a process wherein the toner hot offset temperature (HOT) is from about 210° C. to about 250° C.; a process wherein the magnetite dispersion is obtained by ball milling, attrition, polytroning or media milling with an anionic surfactant resulting in magnetite particles suspended in water containing the anionic surfactant; a process wherein the colorant is carbon black, and the amount of the carbon black dispersion is from about 3 to about 10 percent by weight of toner; a process wherein the crosslinked resin contains resin particles of from about 0.15 to about 0.4 micron in volume average diameter, and a second latex contains a resin free of crosslinking; a process wherein the magnetite size is from about 0.6 micron to about 0.1 micron in average volume diameter, and the colorant is carbon black, and the carbon black is from about 0.01 to about 0.2 micron in average volume diameter; a process wherein the acid is nitric, sulfuric, hydrochloric, citric or acetic acid, and the coagulant is comprised of a first coagulant of a polyaluminum chloride and a second coagulant of a cationic surfactant; a process wherein the base is introduced in the form of a silicate salt dissolved in a base selected from a group consisting of sodium silicate dissolved in sodium hydroxide, potassium silicate dissolved in potassium hydroxide, and wherein the noncrosslinked latex is selected in an amount of from about 10 to about 40 percent by weight of the initial latex (i) to form a shell thereover on the formed aggregates, and which shell is of an optional thickness of about 0.1 to about 1 micron, and wherein the coagulant is a polymetal halide; a process wherein the added latex contains the same resin as the initial latex containing the noncrosslinked resin of (i), or wherein the added latex contains a dissimilar resin than that of the initial latex; a process wherein the temperature at which toner sized aggregates are formed controls the size of the aggregates, and wherein the final toner size is from about 3 to about 25 microns in volume average diameter; a process wherein the aggregation (iv) temperature is from about 40° C. to about 65° C., and wherein the coalescence or fusion temperature of (vii) and (viii) is from about 80° C. to about 95° C., and wherein the coagulant is a polyaluminum halide; a process wherein the time of coalescence or fusion is from about 4 to about 12 hours, and wherein the MICR toner resulting possesses a smooth morphology; a process wherein the latex contains a resin, which resin is free of crosslinking, and which resin is selected from the group comprised of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene poly ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylonitrile); a process wherein the resin contains a carboxylic acid selected from the group comprised of acrylic acid, methacrylic acid, itaconic acid, beta carboxy ethyl acrylate, fumaric acid, maleic acid, cinnamic acid, and the like, and wherein the carboxylic acid is selected in an amount of from about 0.1 to about 10 weight percent; a process wherein a crosslinking component monomer is added to the resin, and wherein the monomer is optionally selected in an amount of from about 0.5 to about 15 percent by weight; a process wherein the latex contains a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid), and wherein the coagulant is a polymetal halide; a toner process comprising the heating of a magnetite dispersion, a colorant dispersion, a latex emulsion free of crosslinking, a crosslinked latex emulsion, and a coagulant of a polymetal halide, and wherein the mixture is aggregated by heating below the latex uncrosslinked resin glass transition temperature; a process wherein there is optionally further included a second coagulant of a cationic surfactant coagulant; a process wherein the coagulant is polymetal halide of a polyaluminum chloride, a polyaluminum sulfosilicate, or a polyaluminum sulfate selected in an amount of about 0.05 to about 0.3 pph by weight of toner, and there optionally added to the mixture a second cationic surfactant coagulant of an alkylbenzyl dimethyl ammonium chloride in an amount, for example, of from about 0.1 to about 2 by weight of toner; a process wherein the wax dispersion contains a polyethylene wax, water, and an anionic surfactant, and wherein the wax is selected in an amount of from about 5 to about 20 weight percent; a process wherein the wax: dispersion contains a polypropylene wax, water, and an anionic surfactant, and wherein the wax is selected in an amount of from about 5 to about 20 weight percent; a process wherein the optional second coagulant is selected from the group comprised of alkylbenzyl dimethyl ammonium chloride, dialkyl benzene-alkyl ammonium chloride, lauryl trimethyl ammonium chloride, alkylbenzyl methyl ammonium chloride, alkyl benzyl dimethyl ammonium bromide, benzalkonium chloride, and cetyl pyridinium bromide present in an amount of about 0.1 to about 5 percent by weight of toner; a toner composition process wherein the acicular magnetite possesses a coercivity of about 250 to about 700 Oe, a particle size of about 0.6 micron in length×0.1 micron in diameter, a coercivity of from about 250 to about 500 Oe, a remanent magnetization (Br) of about 23 to 39 emu/gram, and a saturation magnetization (Bm) of about 70 to about 90 emu/gram; a coercivity of about 345 Oe, a remanent magnetization (Br) of about 35 emu/gram, and a saturation magnetization (Bm) of about 85 emu/gram; a coercivity of about 370 Oe, a remanent magnetization (Br) of about 33 emu/gram, and a saturation magnetization (Bm) of about 83 emu/gram; a magnetite with a coercivity of about 270 Oe, a remanent magnetization (Br) of about 20 emu/gram, and a saturation magnetization (Bm) of about 79 emu/gram; a coercivity of from about 250 to about 400 Oe, a remanent magnetization (Br) of about 23 to about 55 emu/gram, and a saturation magnetization (Bm) of about 70 to about 90 emu/gram; and wherein the acicular magnetite is present in the toner in an amount of from about 10 to about 40 weight percent; a process wherein the acicular magnetite possesses a coercivity of about 250 to about 700 Oe, a particle size of about 0.6 micron in length×0.1 micron in diameter, a magnetite with a coercivity of from about 250' to about 500 Oe, a remanent magnetization (Br) of about 23 to about 39 emu/gram, and a saturation magnetization (Bm) of about 70 to about 90 emu/gram; and wherein the wax is a polyethylene, a polypropylene, or mixtures thereof; a process wherein the crosslinked resin is selected in an amount of from about 1 to about 40 weight percent; a process wherein the crosslinked resin is selected in an amount of from about 2 to about 25 weight percent; a process wherein the crosslinked resin is poly(styrene butylacrylate, beta carboxy ethyl acrylate divinyl, benzene); a process wherein the resin free from crosslinking possesses a molecular weight $M_w$ of about 20,000 to about 500,000, and an onset glass transition (Tg) temperature of from about 45° C. to about 70° C.; a process wherein the crosslinked latex resin possesses a molecular weight $M_w$ of about 100,000 to about 1,000,000, and an onset glass transition (Tg) temperature of about 48° C. to about 58° C.; a process wherein the crosslinked resin latex is selected in an amount of from about 2 to about 0.15 weight percent, the latex free of a crosslinked resin is selected in an amount of from about 40 to about 65 weight percent, the magnetite is selected in an amount of from about 20 to about 35 weight percent, the wax is selected in an amount of from about 5 to about 15 weight percent, and wherein the total thereof is about 100 percent based on the toner; a process wherein the resulting toner possesses a shape factor of from about 110 to about 148; a process wherein the colorant dispersion contains colorant and an anionic surfactant; a process wherein colorant dispersion is comprised of carbon black particles dispersed in water and an anionic surfactant; a process wherein the amount of acicular magnetite selected is from about 15 to about 40 percent by weight of toner, and the coagulant is a polymetal halide present in an amount of about 0.02 to about 0.4 percent by weight of toner; a process where the coagulant is a cationic surfactant present in the amount of about 0.1 to about 2 percent by weight of toner; a process wherein the coagulant is comprised of a mixture of a polymetal halide and a cationic surfactant; a process wherein the amount of acicular magnetite selected is from about 23 to about 32 percent by weight of toner, and the amount of coagulant, which coagulant is a polymetal halide, is present in an amount of about 0.05 to about 0.13 percent by weight of toner and the optional cationic surfactant coagulant is present in an amount of about 0.15 to about 1.5 percent by weight of toner; a process wherein the noncrosslinked resin or polymer has a glass transition temperature (Tg) of about 45° C. to about 70° C.; a process wherein the noncrosslinked resin possesses a weight average molecular weight of about 20,000 to about 90,000; a process wherein the crosslinked latex contains a polymer, wherein the crosslinking percentage or value is, for example, from about 20 to about 75 percent, or about 25 to about 55 of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile), and wherein the polymer in addition contains a crosslinking component, such as divinyl benzene (DVB), to enable the crosslinked resin or polymer, and wherein the crosslinking component can be selected in an amount of from about 0.1 to about 15 weight percent; a process wherein the polymer, in addition to DVB, can contain a carboxylic acid, and which carboxylic acid is, for example, selected from the group comprised of acrylic acid, methacrylic acid, itaconic acid, beta carboxy ethyl acrylate; and the like, and wherein the carboxylic acid is present in an amount of from about 0.5 to about 10 weight percent; a process comprising the heating of a magnetite dispersion, a colorant dispersion, a latex emulsion, a crosslinked polymer, wherein the crosslinking is, for example, from about 30 to about 75 percent, and coagulants, wherein one of the coagulants is a polyaluminum chloride, or bromide, and the optional second coagulant is a cationic surfactant, such as an alkylbenzyl dimethyl ammonium chloride, and wherein the mixture is aggregated by heating below the latex uncrosslinked resin glass transition temperature, followed by the addition of a silicate salt dissolved in a base, and thereafter, heating above the latex uncrosslinked resin glass transition temperature; a process wherein the aggregate mixture pH value is about 7 to about 7.7 obtained by the addition of a silicate salt dissolved in a base like sodium hydroxide; a process wherein the acicular magnetite, which can be comprised of 21 percent FeO and 79 percent $Fe_2O_3$ is selected from the group consisting of B2510, B2540, B2550, HDM-S 7111 with a coercivity of from about 250 to about 500 Oe and a remanent magnetization (Br) of about 23 to about 39 emu/gram, and a saturation magnetization (Bm) of about 75 to about 90 emu/gram, all available from Magnox; MR-BL with a coercivity of about 340 Oe, a remanent magnetization (Br) of about 35 emu/gram, and a saturation magnetization (Bm) of about 85 emu/gram, all available from Titan Kogyo and Columbia Chemicals; MTA-740 with a coercivity of about 370 Oe, a remanent magnetization (Br) of about 0.35 emu/gram, and a saturation magnetization (Bm) of about 83 emu/gram, and all available from Toda Kogyo Inc.; AC 5151M with a coercivity of about 270 Oe, a remanent magnetization (Br) of 20 emu/gram, and a saturation magnetization (Bm) of 79 emu/gram, available from Bayer Corporation; M04232, M04431 with a coercivity of from about 250 to about 400 Oe, a remanent magnetization (Br) of about 23 to about 60 emu/gram, and a saturation magnetization (Bm) of about 70 to about 90 emu/gram, available from Elementis Inc.; wherein the toner exhibits a magnetic signal of from about 125 to about 150 percent of the nominal signal where nominal signal refers to the signal strength of 100 percent, and wherein the acicular magnetite selected is present in the toner in an amount, for example, of from about 10 to about 35 weight percent, and more specifically, in an amount of about 22 to about 32 weight percent by weight of toner; a toner process as illustrated herein wherein the amount of resin free of crosslinking is from about 40 to about 65 weight percent, the amount of crosslinked resin is from about 2 to about 15 weight percent; the amount of magnetite is from about 20 to about 35 weight percent; the colorant amount is from about 4 to about 10 weight percent; and the wax amount is from about 5 to about 15 weight percent; and the total of the components is 100 percent; a process for preparing a chemical toner wherein the blending and aggregation are performed at a pH of about 2 to about 3 or about 2 to about 2.8, while the coalescence is initially conducted at a pH of about 7 to about 8 followed by a reduction in pH to about 5.5 to about 6.5, and followed by further heating for a period of hours, for example, about 6 to about 12 hours; and a process for preparing a MICR toner composition by emulsion aggregation, which toner possesses a smooth shape and feel, and contains from about 20 to about 40 weight percent of an acicular magnetite, wax, crosslinked resin, and colorant, and with a toner particle size distribution of about 1.20 to about 1.26, and which toner provides a MICR signal of about 90 to about 140 percent and a bulk remanence of about 26 emu/gram wherein the remanence can be measured on a tapped powder magnetite sample in a cell of 1 centimeter×1 centimeter×about 4 centimeters. The sample is magnetized between two magnetic pole faces with a saturating magnetic field of 2,000 Gauss, such that the induced magnetic field is perpendicular to one of the 1×4 centimeter faces of the cell. The sample is removed from the saturating magnetic field, and the remanence is measured perpendicular to the above 1 centimeter wide face using a Hall-Effect device or a gaussmeter, such as the F.W. Bell, Inc. Model 615 gaussmeter.

The resin or polymer selected for the process of the present invention can be prepared by a number of known methods such as, for example, emulsion polymerization, including semicontinuous emulsion polymerization methods, and the monomers utilized in such processes can be selected from, for example, styrene, acrylates, methacrylates, butadiene, isoprene acrylonitrile; monomers comprised of an A and B monomer wherein from about 75 to about 95 percent of A and from about 5 to about 25 percent of B is selected, wherein A can be, for example, styrene, and B can be, for example, an acrylate, methacrylate, butadiene, isoprene, or an acrylonitrile; and optionally, acid or basic olefinic monomers, such as acrylic acid, methacrylic acid, beta carboxy ethyl acrylate, acrylamide, methacrylamide, quaternary ammonium halide of dialkyl or trialkyl acrylamides or methacrylamide, vinylpyridine, vinylpyrrolidone, vinyl-N-methylpyridinium chloride and the like. The presence of acid or basic groups in the monomer or polymer resin is optional, and such groups can be present in various amounts of from about 0.1 to about 10 percent by weight of the polymer resin. Chain transfer agents, such as dodecanethiol or carbon tetrabromide, can also be selected when preparing resin particles by emulsion polymerization. Other processes of obtaining resin particles of, for example, from about 0.01 micron to about 1 micron in diameter can be selected like polymer microsuspension process, such as those illustrated in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding process, or other known processes; and toner processes wherein the resin possesses a crosslinking percentage of from about 1 to about 50 or from about 1.5 to about 30.

Colorants include dyes, pigments, and mixtures thereof, colorant examples being illustrated in a number of the copending applications referenced herein, and more specifically, which colorants include known colorants like black, cyan, red, blue, magenta, green, brown, yellow, mixtures thereof, and the like.

Various known colorants, such as pigments, selected for the processes of the present invention and present in the toner in an effective amount of, for example, from about 1 to about 25 percent by weight of toner, and more specifically, in an amount of from about 3 to about 10 percent by weight include, for example, carbon black like REGAL 330®; REGAL 660®; phthalocyanine Pigment Blue 15, Pigment Blue 15.1, Pigment Blue 15.3, Pigment Green 7, Pigment Green 36, Pigment Orange 5, Pigment Orange 13, Pigment Orange 16, Pigment Orange 36, Pigment Red 122, Pigment Red 53.1, Pigment Red 48.1, Pigment Red 48.2, Pigment Red 49.1, Pigment Red 49.2, Pigment Red 22, Pigment Red 185, Pigment Red 188, Pigment Red 210, Pigment Red 238, Pigment Red 170, Pigment Red 23, Pigment Red 81.2, Pigment Red 81.3, Pigment Red 57, Pigment Red 17, Pigment Red 169, Pigment Violet 19, Pigment Violet 23, Pigment Violet 3, Pigment Violet 27, Pigment Yellow 65, Pigment Yellow 1, Pigment Yellow 83, Pigment Yellow 17, Pigment Yellow 12, Pigment Yellow 14, Pigment Yellow 97, Pigment Yellow 74, Pigment Yellow 3, Pigment Yellow 75, available from Sun Chemicals, PIGMENT VIOLET 1™, PIGMENT RED 48™, LEMON CHROME YELLOW DCC 1026™, E.D. TOLUIDINE RED™ and BON RED C™ available from Dominion Color Corporation, Ltd. Toronto, Ontario, NOVAPERM YELLOW FGL™, HOSTAPERM PINK E™ available from Hoechst, and CINQUASIA MAGENTA™ available from E.I. DuPont de Nemours and Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment identified in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16', a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL, wherein the colorant is present, for example, in the amount of about 3 to about 15 weight percent of the toner. Organic dye examples include known suitable dyes, reference the Color Index, and a number of U.S. patents. Organic soluble dye examples, preferably of a high purity, for the purpose of color gamut are Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, and more specifically, from about 5 to about 20 weight percent of the toner. Colorants include pigment, dye, mixtures of pigment and dyes, mixtures of pigments, mixtures of dyes, and the like.

Crosslinked resin examples with crosslinking values as illustrated herein, and yet more specifically, of, for example, from about 25 to about 80, and more specifically, from about 30 to about 65 percent, and which resins are selected in various amounts, such as from about 1 to about 20, and more specifically, from about 5 to about 10 weight percent based on the weight percentages of the remaining toner components, include the resins illustrated herein, which resins are crosslinked by known crosslinking compounds, such as divinyl benzene. Specific crosslinked resin examples are poly(styrene divinyl benzene beta CEA), poly(styrene butyl acrylate divinyl benzene beta CEA), poly(styrene divinyl benzene acrylic acid), poly(styrene butyl acrylate divinyl benzene acrylic acid), and the like.

Examples of anionic surfactants that can be selected for the processes illustrated herein include, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN RK™, NEOGEN SC™ from Kao and the like. An effective concentration of the anionic surfactant generally employed is, for example, from about 0.01 to about 10 percent by weight, and preferably from about 0.1 to about 5 percent by weight of monomers used to prepare the toner polymer resin.

Examples of nonionic surfactants that can be selected for the processes illustrated herein and that may be, for example, included in the resin latex dispersion are, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy)ethanol, available from Rhodia as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®. A suitable concentration of the nonionic surfactant is, for example, from about 0.01 to about 10 percent by weight, and more specifically, from about 0.1 to about 5 percent by weight of monomers used to prepare the toner polymer resin.

Examples of cationic surfactants, which are usually positively charged, selected for the toners and processes of the present invention include, for example, alkylbenzyl dimethyl ammonium chloride dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof. A suitable amount of cationic surfactant can be selected, such as from about 0.2 to about 5 percent by weight of the toner components.

Examples of silicates that can be selected are sodium silicates, such as those commercially available like A®1647, A®1847, A®2445, A®2447, A®2645, BJ™ 120, BW™ 50, C™, D™, E™, K®, M®, N®; N®38, N® Clear, O®, OW®, RU™, SS® 22, SS® 75, STAR™ STARSO®, STIXSI™ RR, V®. Potassium silicates such as KASIL® 1, KASIL® 6, KASIL® 23, all available from Philadelphia Quartz; sodium silicate Cat. #33,844-3 available from Aldrich Chemicals; OXYCHEM GRADE 40, GRADE 42, GRADE JW-25, GRADE 47, GRADE 49F, GRADE 50, GRADE 52, GRADE WD-43 all available from Occidental Chemical Corporation; KS NO1, NO2, NO3; NO4, SC2, SP2; SB3, G3, SS3 all available from ESEL TechTra Inc., South Korea; sodium silicates available from J.T. Baker, and the like. The silicates in embodiments exhibit a mole ratio of $SiO_2:Na_2O$ of about 1.5 to about 3.5, and a mole ratio of $SiO_2:Na_2O$ about 1.8 to about 2.5; a particle size of about 5 to 80 nanometers, a viscosity at 20° C. and as measured by a Brookfield viscometer of about 20 to about 1,200 centipoises and a density of about 1.25 to about 1.70 gram per $cm^3$.

Counterionic coagulants selected for the processes illustrated herein can be comprised of organic, or inorganic components, and the like. For example, in embodiments the ionic surfactant of the resin latex dispersion can be an anionic surfactant, and the counterionic coagulant can be a polymetal halide or a polymetal sulfosilicate (PASS). Coagulants that can be included in amounts of, for example, from about 0.05 to about 10 weight percent include polymetal halides, polymetal sulfosilicates monovalent, divalent or multivalent salts optionally in combination with cationic surfactants, and the like. Inorganic cationic coagulants include, for example, polyaluminum chloride (PAC), polyaluminum sulfosilicate (PASS), aluminum sulfate, zinc sulfate, or magnesium sulfate.

The coagulant is in embodiments present in an aqueous medium in an amount of from, for example, about 0.05 to about 10 percent by weight, and more specifically, in an amount of from about 0.075 to about 2 percent by weight. The coagulant may also contain minor amounts of other components, such as for example nitric acid. The coagulant is usually added slowly while continuously subjecting the mixture resulting to high shear, for example, by stirring with a blade at about 3,000 to about 10,000 rpm, and preferably about 5,000 rpm, for about 1 to about 120 minutes. A high shearing device, for example an intense homogenization device, such as the in-line IKA SD-41, may be used to ensure that the coagulant is homogeneous and uniformly dispersed.

Examples of waxes include those as illustrated herein, such as those of the aforementioned copending applications, polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K.K., and similar materials. The commercially available polyethylenes selected possess, it is believed, a molecular weight $M_w$ of from about 500 to about 15,000, while the commercially available polypropylenes are believed to have a molecular weight of from about 3,000 to about 7,000. Examples of functionalized waxes are amines, amides, for example AQUA SUPERSLIP6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsions, for example: JONCRYL 74™, 89™, 130™, 537™, and 538™, all available from SC Johnson Wax; chlorinated polypropylenes and polyethylenes available from Allied Chemical and Petrolite Corporation and SC Johnson Wax. The amounts of the wax selected in embodiments is, for example, from about 3.5 to about 15 percent by weight of toner.

Examples of dispersants that can be suitable for dispersing the magnetite pigment particles include functional copolymers, such as for example methyl vinyl ether-maleic acid, methyl vinyl ether-maleic acid calcium sodium salt, hydrophobically modified polyethers, polyvinylpyrrolidone homopolymers, alkylated vinylpyrrolidone copolymers, vinyl acetate/vinylpyrrolidone copolymers, vinylpyrrolidone/styrene block, poly(methyl vinyl ether/maleic anhydride) (linear interpolymer with 1:1 molar ratio), dimethylaminoethyl methacrylate, ethylene-vinyl acetate copolymer of maleic anhydride and acrylic acid, polystyrene-maleic anhydride, styrene-acrylic ester, ethyl acrylate/methyl methacrylate, carboxylated poly-n-butyl acrylates, and ethylene vinyl alcohol, and which, for example, permit the magnetite to be readily dispersible into a submicron particle size of, for example, about 30 to about 400 nanometers in either an acid or a base resulting in a magnetite pigment that can be stabilized by resin particles.

The solids content of the resin latex dispersion is not particularly limited, thus the solids content may be from, for example, about 10 to about 90 percent. With regard to the colorants, such as carbon black, in some instances they are available in the wet cake or concentrated form containing water, and can be easily dispersed utilizing a homogenizer or simply by stirring or ball milling, attrition, or media milling. In other instances, pigments are available only in a dry form whereby dispersion in water is effected by microfluidizing using, for example, a M-110 microfluidizer or an ultimizer, and passing the pigment dispersion from about 1 to about 10 times through a chamber by sonication, such as using a Branson 700 sonicator, with a homogenizer, ball milling, attrition, or media milling with the optional addition of dispersing agents such as the aforementioned ionic or nonionic surfactants.

During coalescence, the pH is increased, for example, from about 2 to about 3 to about 7 to about 8; from about 2 to about 2.8 to about 7 to about 7.5 by the addition of a suitable pH agent of, for example, sodium silicate dissolved in sodium hydroxide to provide for the stabilization of the aggregated particles and to prevent/minimize the toners size growth and loss of GSD during further heating, for example, raising the temperature about 10° C. to about 50° C. above the resin Tg. Also, the silicate provides a coating of silica on the magnetite particles thereby lowering the Pzc of the magnetite such that during the coalescence where the pH of the mixture reduced to below about 5 and preferably about 4.5, the fusion of the aggregates can be accomplished by using an acid. Examples of pH reducing agents include, for example, nitric acid, citric acid, sulfuric acid or hydrochloric acid, and the like.

In embodiments, the toner particles formed by processes illustrated herein possess, for example, an average volume diameter of from about 0.5 to about 25, and more specifically, from about 1 to about 10 microns, and narrow GSD characteristics of, for example, from about 1.05 to about 1.25, or from about 1.15 to about 1.25 as measured by a Coulter Counter. The toner particles also possess an excellent shape factor, for example, of 135 or less wherein the shape factor refers, for example, to the measure of toner smoothness and toner roundness, where a shape factor of about 100 is considered spherical and smooth without any surface protrusions, while a shape factor of about 150 is considered to be rough in surface morphology and the shape is like a potato.

The toner particles illustrated herein may also include known charge additives in effective amounts of, for example, from about 0.1 to about 5 weight percent such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and the like. Surface additives that can be added to the toner compositions after washing or drying include, for example, metal salts, metal salts of fatty acids, colloidal silicas, metal oxides, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Specific additives include zinc stearate and AEROSIL R972® available from Degussa Chemical and each present in an amount of from about 0.1 to about 2 percent which can be added during the aggregation process or blended into the formed toner product, calcium stearate and the like.

Developer compositions can be prepared by mixing the toners obtained with the process of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

The following Examples are provided. Parts and percentages are by weight unless otherwise indicated and temperatures are in degrees Centigrade.

EXAMPLES

Preparation of Noncrosslinked Latex A:

A latex emulsion (i) comprised of polymer particles generated from the emulsion polymerization of styrene, butyl acrylate and beta carboxy ethyl acrylate (Beta CEA) was prepared as follows. A surfactant solution of 434 grams of DOWFAX 2A1™ (anionic emulsifier –55 percent active ingredients) and 387 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while being stirred at 100 RPM. The reactor was then heated to 80° C.

Separately, 6.11 kilograms of ammonium persulfate initiator were dissolved in 30.2 kilograms of deionized water. Also, separately a monomer emulsion A was prepared in the following manner. 315.7 Kilograms of styrene, 91.66 kilograms of butyl acrylate, 12.21 kilograms of beta-CEA, 7.3 kilograms of 1-dodecanethiol, 1.42 kilograms of decanediol diacrylate (ADOD), 8.24 kilograms of DOWFAX™ (anionic surfactant), and 193 kilograms of deionized water were mixed to form an emulsion. Five percent of the above emulsion was then slowly fed into the reactor containing the aqueous surfactant phase at 80° C. to form seeds wherein "seeds" refer, for example, to the initial emulsion latex added to the reactor prior to the addition of the initiator solution, while being purged with nitrogen. The above initiator solution was then slowly charged into the reactor forming about 5 to about 12 nanometers of latex "seed" particles. After 10 minutes, the remainder of the emulsion was continuously fed using metering pumps.

After the above monomer emulsion was charged into the main reactor, the temperature was maintained at 80° C. for an additional 2 hours to complete the reaction. The reactor contents were then cooled down to about 25° C. The resulting isolated product was comprised of 40 weight percent of submicron, 0.5 micron diameter resin particles of styrene/butylacrylate/beta CEA suspended in an aqueous phase containing the above surfactant. The molecular properties resulting for the resin latex were $M_w$ (weight average molecular weight) of 35,000, $M_n$ of 10,600 as measured by a Gel Permeation Chromatograph, and a midpoint Tg of 55.8° C., as measured by a Differential Scanning Calorimeter, where the midpoint Tg is the halfway point between the onset and the offset Tg of the polymer.

Preparation of the Crosslinked Latex B (50 Nanometers):

A crosslinked latex emulsion comprised of polymer particles generated from the emulsion polymerization of styrene, butyl acrylate and beta carboxy ethyl acrylate (β) CEA was prepared as follows. A surfactant solution of 4.08 kilograms of NEOGEN™ RK (anionic emulsifier) and 78.73 kilograms of deionized water was prepared by mixing these components for 10 minutes in a stainless steel holding tank. The holding tank was then purged with nitrogen for 5 minutes before transferring the resulting mixture into the above reactor. The reactor was then continuously purged with nitrogen while the contents were being stirred at 100 RPM. The reactor was then heated up to 76° C., and held there for a period of 1 hour.

Separately, 1.24 kilograms of ammonium persulfate initiator was dissolved in 13.12 kilograms of deionized water.

Also separately, monomer emulsion was prepared in the following manner. 47.39 Kilograms of styrene, 25.52 kilograms of butyl acrylate, 2.19 kilograms of β-CEA, 0.729 kilogram of divinyl benzene (DVB) crosslinking agent, 1.75 kilograms of NEOGEN™ RK (anionic surfactant), and 145.8 kilograms of deionized water were mixed to form an emulsion. One (1) percent of the emulsion was then slowly fed into the reactor, while the reactor was being purged with nitrogen, containing the aqueous surfactant phase at 76° C. to form "seeds". The initiator solution was then slowly charged into the reactor and after 40 minutes the remainder of the emulsion was continuously fed in using metering pumps over a period of 3 hours.

Once all the monomer emulsion was charged into the above main reactor, the temperature was held at 76° C. for an additional 4 hours to complete the reaction. Cooling was then accomplished and the reactor temperature was reduced to 35° C. The product was collected into a holding tank.

After drying, the resin latex onset Tg was 53.5° C. The resulting latex was comprised of 25 percent crosslinked resin, 72.5 percent water and 2.5 percent anionic surfactant. The resin had a ratio of 65:35:3 pph:1 pph of styrene:butyl acrylate:β-CEA:DVB. The mean particle size of the gel latex was 50 nanometers as measured on disc centrifuge, and the resin in the latex possessed a crosslinking value of 25 percent as measured by gravimetric method.

Wax and Pigment Dispersions:

The aqueous wax dispersion utilized in the following Examples was generated using waxes available from Baker-Petrolite; (1) P725 polyethylene wax with a low molecular weight $M_w$ of 725, and a melting point of 104° C., or (2) P850 wax with a low molecular weight of 850 and a melting point of 107° C. and NEOGEN RK™ as an anionic surfactant/dispersant. The wax particle diameter size was determined to be approximately 200 nanometers, and the wax slurry was a solid loading of 30 percent (weight percent throughout).

The pigment dispersion, obtained from Sun Chemicals, was an aqueous dispersion containing carbon black (REGAL 330®), an anionic surfactant, 2 percent, and 79 percent water.

Preparation of Solution A:

To 20 grams of a basic sodium (sodium hydroxide) silicate solution containing 27 percent of $SiO_2$ solids were added 40 grams of 4 percent sodium hydroxide providing a solution containing 5.4 percent of $SiO_2$ solids in 60 grams of sodium hydroxide; solution A.

Preparation of Solution B:

To 20 grams of a basic sodium silicate solution containing 27 percent sodium silicate solids dissolved in sodium hydroxide were added 20 grams of a 4 percent sodium hydroxide solution providing a solution containing 5.4 percent sodium silicate solids in 40 grams of sodium hydroxide; solution B.

Example I

25 Percent of Magnetite—PAC (0.1 pph/1.36 pph of $SiO_2$):

79 Grams of MAGNOX B2550™ acicular magnetite comprised of 21 percent FeO and 79 percent $Fe_2O_3$ having a particle size of about 0.6 micron×0.1 micron were added to 600 grams of water containing 1.3 grams of a 20 percent aqueous anionic surfactant (NEOGEN RK™) to which 85 grams of the above 18 percent carbon black solution were added. The resultant mixture was then polytroned or homogenized for a period of 3 minutes at speeds of 5,000 rpm to provide a pigment dispersion. To the resulting pigment dispersion were added 90 grams of a dispersion of the above submicron polyethylene P850 wax particles (30 percent solids) followed by the addition of 300 grams of the above prepared anionic Latex A comprising submicron latex particles (40 percent solids) of styrene/butylacrylate/beta CEA, and 64 grams of the crosslinked Latex B of styrene/butylacrylate/divinyl benzene beta CEA (25.5 percent solids) and then polytroned at a speed of 5,000 rpm for a period of 5 minutes. 300 Grams of water were then added to reduce the viscosity of the resulting blend to which was then added an aqueous PAC (polyaluminum chloride) coagulant solution comprising 3.1 (equivalent of 0.1 pph by weight of toner) grams of 10 percent solids placed in 23 grams of 0.3 M nitric acid.

The resulting blend was then heated to a temperature of 48° C. while stirring for a period of 6 hours to obtain a particle size diameter of 6.2 with a GSD of 1.19. 140 Grams of the above noncrosslinked latex were then added to the aggregate mixture followed by stirring at 48° C. for an additional 30 minutes to provide a particle size of 6.5 and a GSD of 1.20. The aggregate mixture was then stabilized from further growth by changing the pH of the mixture from about 2.6 to about 7.4 by the addition of 47.5 grams of sodium silicate solution (solution A), which contains 1.36 pph of silica by weight of toner.

The resulting mixture was then heated to 93° C. during which the pH as measured by an Orion pH meter of the mixture decreased to 6.7. After 1 hour at 93° C., the pH was reduced in stages to 5.5 followed by 4.9 after an additional 30 minutes with an aqueous 1.25 percent of nitric acid solution. After a period of 8 hours at 93° C., the toner particle size measured was 6.7 microns with a GSD of 1.20. The resultant mixture was cooled and the toner obtained was washed 4 times with water and dried on a freeze dryer. The resulting toner was comprised of 25 percent magnetite, 5 percent crosslinked resin and 57.1 percent uncrosslinked resin, 4.4 percent carbon black, and 8.5 percent wax. The resulting toner had a silica ($SiO_2$) content of 1.31 pph, while the aluminum content was 0.075 pph by weight of toner. Charging of the resulting toner indicated a tribo of −28 μC/gram as opposed to −16 μC/gram of the toner prepared without the use of sodium silicate. The development of the resulting toner as a function of development voltage under various throughput conditions illustrated that the toner performance was stable to aging under various throughputs of printing. The target MICR signal of 120 percent of the nominal (nominal being 100 percent) was achieved at a development voltage of 250. The toner was then evaluated in a Xerox Corporation DC 265 engine and toner development as a function of voltage did not change at different throughputs conditions, for example the development at time zero, and that after 1,000 prints including under zero throughput conditions (xerographic stress case) at a given voltage indicated little toner aging. The target MICR signal of 0.120 percent of the nominal where nominal is 100 percent was readily achieved at a development voltage of 250 volts.

The above toner when fused in a Xerox Corporation DC 265 xerographic engine had MFT of 187° C. and a HOT offset temperature greater than 210° C., the optimum temperature that could be measured by the temperature detector used. The shape factor of the toner was 128 where a SF of 100 is considered very smooth and spherical in shape; a SF of 145 is considered irregular in shape with a rough morphology; and a SF of 125 is considered a potato shape with a smooth surface.

Example II

25 Percent Magnetite—PAC (0.1 pph/1.4 pph of $SiO_2$):

79 Grams of MAGNOX B2550™ acicular magnetite comprised of 21 percent FeO and 79 percent $Fe_2O_3$ having a particle size of about 0.6 micron×0.1 micron were added to 600 grams of water containing 1.3 grams of a 20 percent aqueous anionic surfactant (NEOGEN RK™) to which 85 grams of the above 18 percent carbon black solution were added. The resultant mixture was then polytroned or homogenized for a period of 3 minutes at speeds of 5,000 rpm to provide a pigment dispersion. To the resulting pigment dispersion were added 90 grams of a dispersion of the above submicron polyethylene P850 wax particles (30 percent solids) followed by the addition of 300 grams of the above prepared anionic Latex A comprising submicron latex particles (40 percent solids) of styrene/butylacrylate/beta CEA, and 64 grams of the crosslinked Latex B of styrene/butylacrylate/divinyl benzene beta CEA (25.5 percent solids) and then the mixture resulting was polytroned at a speed of 5,000 rpm for a period of 5 minutes. 300 Grams of water were then added to reduce the viscosity of the resulting blend to which was then added an aqueous PAC coagulant solution comprising 3.1 (equivalent of 0.1 pph by weight of toner) grams of 10 percent solids placed in 23 grams of 0.3 M nitric acid.

The resulting blend was then heated to a temperature of 48° C. while stirring for a period of 4 hours to obtain a particle size of 5.4 with a GSD of 1.21. 140 Grams of the above noncrosslinked latex were then added to the aggregate mixture and stirred at 45° C. overnight (18 to 22 hours) to provide a particle size of 5.8 and a GSD of 1.19. The aggregate mixture was then stabilized from further growth by changing the pH of the mixture from about 2.6 to about 7.2 with the addition of 49 grams of the sodium silicate solution (solution A), which is 1.4 pph of silica by weight of toner.

The resulting mixture was then heated to 93° C. during which the pH of the mixture decreased to 6.4. After 1 hour at 93° C., the pH was reduced in stages to 5.5, followed by 4.2 after an additional 60 minutes with an aqueous 1.25 percent of nitric acid solution. After a period of 8 hours at 93° C., the particle size measured was 6.3 microns with a GSD of 1.20. The resultant mixture was cooled and the toner obtained was washed 4 times with water and dried on a freeze dryer. The resulting toner was comprised of 25 percent magnetite, 5 percent crosslinked resin, 57.1 percent of uncrosslinked resin, 4.4 percent carbon black, and 8.5 percent wax. The resulting toner had a silica content of 1.28 pph, while the aluminum content was 0.08 pph by weight of toner. The charging characteristics of the toner were comparable to that of Example I. The toner when fused in a Xerox Corporation DC 265 xerographic engine had possessed MFT of 190° C. and a HOT offset temperature greater than 210° C. The shape factor of the toner was 125.

Example III
25 Percent Magnetite—PAC (0.1 pph/1.2 pph of SiO$_2$:

79 Grams of MAGNOX B2550™ acicular magnetite comprised of 21 percent FeO and 79, percent Fe$_2$O$_3$ and with a particle size of about 0.6 micron×0.1 micron were added to 600 grams of water containing 1.3 grams of 20 percent aqueous anionic surfactant (NEOGEN RK™) to which 85 grams of the above 18 percent carbon black solution were added. The resultant mixture was then polytroned or homogenized for a period of 3 minutes at a speed of 5,000 rpm to provide a pigment dispersion. To the resulting pigment dispersion were added 90 grams of a dispersion of the above submicron polyethylene P850 wax particles (30 percent solids) followed by the addition of 300 grams of the above prepared anionic Latex A comprising submicron latex particles (40 percent solids) of styrene/butylacrylate/beta CEA, and 64 grams of the crosslinked Latex B of styrene/butylacrylate/divinyl benzene beta CE A (25.5 percent solids) and then polytroned at a speed of 5,000 rpm for a period of 5 minutes. 300 Grams of water were then added to reduce the viscosity of the resulting blend to which then was added an aqueous PAC coagulant solution comprising 3.1 (equivalent of 0.1 pph by weight of toner) grams of 10 percent solids placed in 23 grams of 0.3 M nitric acid.

The resulting blend was then heated to a temperature of 50° C. while stirring for a period of 4 hours to obtain a particle size of 5.9 with a GSD of 1.20. 140 Grams of the above noncrosslinked latex were then added to the aggregate mixture and stirred at 48° C. overnight (18 to 21 hours) to provide a particle size of 6.5 and a GSD of 1.20. The aggregate mixture was then stabilized from further growth by changing the pH of the mixture from about 2.6 to about 7.2 with the addition of 42 grams of sodium silicate solution (solution A), which is 1.2 pph of silica by weight of toner.

The resulting mixture was then heated to 93° C. during which the pH of the mixture decreased to 6. After 2 hours at 93° C., the pH was reduced in stages of 4.7 followed by 3.9 after an additional 60 minutes with an aqueous 1.25 percent of nitric acid solution. After a period of 8 hours at 93° C., the particle size measured was 6.7 microns with a GSD of 1.21. The resultant mixture was cooled and the toner obtained was washed 4 times with water and dried on a freeze dryer. The resulting toner was comprised of 25 percent magnetite, 5 percent crosslinked resin, 57.1 percent uncrosslinked resin, 4.4 percent carbon black, and 8.5 percent wax. The resulting toner had a silica content of 1.10 pph, while the aluminum content was 0.073 pph by weight of toner. The charging characteristics of the toner were comparable to that of Example I. The toner when fused in a Xerox Corporation DC 265 xerographic engine had MFT of 183° C. and a HOT offset temperature greater than 210° C. The shape factor of the toner was 126.

Example IV
25 Percent Magnetite—PAC (0.1 pph/1.2 pph of SiO$_2$):

79 Grams of MAGNOX B2550™ acicular magnetite comprised of 21 percent FeO and 79 percent Fe$_2$O$_3$ having a particle size of about 0.6 micron×0.1 micron were added to 600 grams of water containing 1.3 grams of 20 percent aqueous anionic surfactant (NEOGEN RK™) to which 85 grams of the above 18 percent carbon black solution were added. The resultant mixture was then polytroned or homogenized for a period of 3 minutes at speeds of 5,000 rpm to provide a pigment dispersion. To the resulting pigment dispersion were added 90 grams of a dispersion of the above submicron polyethylene P850 wax particles (30 percent solids) followed by the addition of 300 grams of the above prepared anionic Latex A comprising submicron latex particles (40 percent solids) of styrene/butylacrylate/beta CEA, and 64 grams of the crosslinked Latex B of styrene/butylacrylate/divinyl benzene beta CEA (25.5 percent solids) and then polytroned at speed of 5,000 rpm for a period of 5 minutes. 300 Grams of water were then added to reduce the viscosity of the resulting blend to which then was added an aqueous PAC coagulant solution comprising 3.1 (equivalent of 0.1 pph by weight of toner) grams of 10 percent solids placed in 23 grams of 0.3 M nitric acid.

The resulting blend was then heated to a temperature of 50° C. while stirring for a period of 4 hrs to obtain a particle size of 5.7 with a GSD of 1.22. 140 Grams of the above noncrosslinked latex were then added to the aggregate mixture and stirred at 48° C. overnight and then heated to 50° C. to provide a particle size of 6.4 and a GSD of 1.22. The aggregate mixture was then stabilized from further growth by changing the pH of the mixture from about 2.6 to about 7.2 with the addition of 42 gm of the sodium silicate solution (solution A), which is equivalent 1.2 pph of silica by weight of toner.

The resulting mixture was then heated to 93° C. during which the pH the p of the mixture drifted down to 6.5. After 1 hour at 93° C., the pH was reduced to 4.2 directly with an aqueous 1.25 percent of nitric acid solution. After a period of 8 hours at 93° C., the particle size measured was 6.6 microns with a GSD of 1.22. The resultant mixture was cooled and the toner obtained was washed 4 times with water and dried on a freeze dryer. The resulting toner was comprised of 25 percent magnetite, 5 percent of crosslinked resin and 57.1 percent of uncrosslinked resin, 4.4 percent carbon black, and 8.5 percent wax. The resulting toner had a silica content of 1 pph, while the aluminum content was 0.077 pph by weight of toner. The charging characteristics of the toner were comparable to that of Example I.

Example V
30 Percent Magnetite—PAC (0.1 pph/1.7 pph of $SiO_2$):

93 Grams of MAGNOX B2550™ acicular magnetite comprised of 21 percent FeO and 79 percent $Fe_2O_3$ having a particle size of about 0.6 micron×0.1 micron were added to 600 grams of water containing 1.3 grams of 20 percent aqueous anionic surfactant (NEOGEN RK™) to which 85 grams of the above 18 percent carbon black solution were added. The resulting mixture was then polytroned or homogenized for a period of 3 minutes at speeds of 5,000 rpm to provide a pigment dispersion. To the resulting pigment dispersion were added 90 grams of a dispersion of the above submicron polyethylene P850 wax particles (30 percent solids) followed by the addition of 280 grams of the above prepared anionic Latex A comprising submicron latex particles (40 percent solids) of styrene/butylacrylate/beta CEA, and 64 grams of the crosslinked Latex B of styrene/butylacrylate/divinyl benzene beta CEA (25.5 percent solids), and then the mixture resulting was polytroned at a speed of 5,000 rpm for a period of 5 minutes. 300 Grams of water were then added to reduce the viscosity of the resulting blend to which then was added an aqueous PAC coagulant solution comprising 3.1 (equivalent of 0.1 pph by weight of toner) grams of 10 percent solids placed in 23 grams of 0.3 M nitric acid.

The resulting blend was then heated to a temperature of 48° C. while stirring for a period of 5 hours to obtain a particle size of 6.1 with a GSD of 1.20. 130 Grams of the above noncrosslinked latex were then added to the aggregate mixture and stirred at 47° C. overnight to provide a particle size of 7.1 and a GSD of 1.22. The aggregate mixture was then stabilized from further growth by changing the pH of the mixture from about 2.6 to about 7.4 with the addition of 40 grams of a sodium silicate solution (solution B) which contained 1.7 pph of silica by weight of toner.

The resulting mixture was then heated to 93° C. during which the pH of the mixture decreased to 6.6. After 1 hour at 93° C., the pH was reduced to 5.1 with an aqueous 1.25 percent of nitric acid solution and heated for 3 hours resulting in a particle size of 7.3 and a GSD of 1.19. The pH was then reduced to 4.7. After a period of 8 hours at 93° C., the particle size measured was 7.4 microns with a GSD of 1.19. The resultant mixture was cooled and the toner obtained was washed 4 times with water and dried on a freeze dryer. The resulting toner was comprised of 30 percent magnetite, 5 percent crosslinked resin, 52.1 percent noncrosslinked resin, 4.4 percent carbon black, and 8.5 percent wax. The resulting toner had a silica content of 1.5 pph, while the aluminum content was 0.09 pph by weight of toner. The charging characteristics of the toner were comparable to that of Example I.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A toner process comprised of heating a mixture of an acicular magnetite dispersion, a colorant dispersion, a wax dispersion, a first latex containing a crosslinked resin, and a second latex containing a resin free of crosslinking in the presence of a coagulant to provide aggregates, stabilizing the aggregates with a silicate salt dissolved in a base, and further heating said aggregates to provide coalesced toner particles.

2. A process in accordance with claim 1 wherein silica is incorporated in said toner by an in situ method, and wherein said silica is obtained from said silicate.

3. A process in accordance with claim 2 wherein said silicate is selected in an amount of from about 0.5 to about 2 percent by weight of toner.

4. A process in accordance with claim 1 comprising
   (i) mixing said acicular magnetite dispersion containing water and an anionic surfactant, and said colorant dispersion containing carbon black, water, and an anionic surfactant, and optionally a nonionic surfactant, and wherein said wax dispersion is comprised of submicron wax particles of from about 0.1 to about 0.5 micron in diameter by volume, and which wax is dispersed in water and contains an anionic surfactant to provide a mixture containing magnetite, colorant, and a wax;
   (ii) wherein the resulting mixture is blended with said first and second latex, said second latex comprising submicron noncrosslinked resin particles of about 150 to about 300 nanometers in diameter containing water, an anionic surfactant or a nonionic surfactant, and wherein said second latex comprises submicron crosslinked gel particles of about 30 to about 150 nanometers in diameter, and containing water and an anionic surfactant or a nonionic surfactant;
   (iii) wherein the resulting blend of (ii) possesses a pH of about 2.2 to about 2.8, and to which is added a coagulant to initiate flocculation or aggregation of said resulting components;
   (iv) heating the resulting mixture of (iii) below about the glass transition temperature (Tg) of the resin free of crosslinking to form aggregates;
   (v) adding to the formed aggregates a latex comprised of a noncrosslinked resin suspended in an aqueous phase containing an ionic surfactant and water;
   (vi) adding to the resulting mixture of (v) an aqueous solution of a silicate salt dissolved in a base to thereby change the pH, which is initially from about 2 to about 2.8, to arrive at a pH of from about 7 to about 7.4 resulting in a coating of silica on the aggregate particles containing magnetite;
   (vii) heating the resulting mixture of (vi) above about the Tg of the noncrosslinked resin of (i) and allowing the pH to decrease;
   (viii) retaining the mixture of (vii) at a temperature of from about 85° C. to about 95° C. for an optional period of about 10 to about 60 minutes, followed by a pH reduction with an acid to arrive at a pH of from about 4.2 to about 4.8, which pH is below about the Pzc of the magnetite particles wherein the Pzc is the pH of the mixture particles when said particles are free of a positive or a negative charge, and optionally wherein an increase in temperature results in a decreased Pzc value;
   (ix) retaining the mixture temperature at from about 85° C. to about 95° C. for an optional period of about 5 to about 10 hours to assist in permitting the fusion or coalescence of the toner aggregates and to obtain smooth particles;
   (x) washing the resulting toner slurry;
   (xi) isolating the formed toner particles, and drying.

5. A process in accordance with claim 2 wherein said silica forms a coating on said aggregates.

6. A process in accordance with claim 4 wherein said silicate reacts with said magnetite rendering said magnetites substantially insensitive to pH fluctuations and resulting in the magnetite Point of Zero Charge (Pzc) being substantially ineffective.

7. A process in accordance with claim 4 wherein the Pzc of said magnetite is altered by said silica, which silica is present as a coating on said magnetite, and wherein said silica is obtained from said silicate, and wherein said silicate is a sodium silicate, a potassium silicate, or a magnesium silicate sulfate, and said coagulant is a polymetal halide.

8. A process in accordance with claim 4 wherein said pH is decreased to about 4.5, said pH being lower than that of said magnetite which is at a pH of about 5.3.

9. A process in accordance with claim 1 wherein said silicate and said base are respectfully sodium silicate dissolved in sodium hydroxide, or potassium silicate (K2O/SiO2) dissolved in potassium hydroxide.

10. A process in accordance with claim 1 wherein said silicate is sodium silicate, thereby forming SiO2:Na2O with a weight ratio of about 1.6 to about 3.2.

11. A process in accordance with claim 2 wherein from about 75 to about 95 percent of said silica is introduced and retained in the toner surface.

12. A process in accordance with claim 2 wherein said coagulant is selected from the group consisting of polyaluminum chloride (PAC), polyaluminum sulfosilicate (PASS), aluminum sulfate, zinc sulfate, and magnesium sulfate.

13. A process in accordance with claim 12 wherein from about 80 to about 90 percent of said coagulant metal ion is retained in said toner.

14. A process in accordance with claim 1 wherein said colorant is carbon black, and wherein said carbon black dispersion comprises carbon black particles of from about 0.01 to about 0.2 micron diameter dispersed in water and an anionic surfactant, and wherein said colorant is present in an amount of from about 4 to about 10 weight percent.

15. A process in accordance with claim 1 wherein the amount of acicular magnetite selected is from about 20 to about 40 percent by weight of toner, said colorant is carbon black present in the amount of from about 4 to about 8 percent by weight of toner, and said wax is present in the amount of about 4 to about 12 percent by weight of toner; said crosslinked resin is present in the amount of about 5 to about 10 percent by weight; said uncrosslinked resin is present in an amount of about 55 to about 65 percent by weight of toner; and said coagulant is comprised of polymetal halide present in an amount of about 0.02 to about 2 percent by weight of toner.

16. A process in accordance with claim 1 wherein said acicular magnetite is from about 0.6 to about 0.1 micron in average volume diameter and is selected in an amount of from about 23 to about 35 percent by weight of toner, and wherein said coagulant is a polymetal halide selected in an amount of about 0.05 to about 0.15 percent by weight of toner.

17. A process in accordance with claim 1 wherein the acicular magnetite utilized exhibits a coercivity of from about 250 to about 700 Oe.

18. A process in accordance with claim 1 wherein said acicular magnetite possesses a coercivity of from about 250 to about 500 Oe, a remanent magnetization (Br) of about 23 to about 39 emu/gram, and a saturation magnetization (Bm) of about 70 to about 90 emu/gram.

19. A process in accordance with claim 1 wherein the toner exhibits a magnetic signal of about 90 to about 150 percent of the nominal where the nominal is a signal strength of about 100 percent.

20. A process in accordance with claim 1 wherein the crosslinked resin contains resin particles of from about 0.15 to about 0.4 micron in volume average diameter, and said second latex contains a resin free of crosslinking of a diameter of about 0.15 to about 0.4 micron.

21. A process in accordance with claim 4 wherein said acid is nitric, sulfuric, hydrochloric, citric or acetic acid, and said coagulant is a polyaluminum chloride.

22. A process in accordance with claim 4 wherein said noncrosslinked resin is comprised of submicron particles suspended in said aqueous phase containing an anionic surfactant, and wherein said noncrosslinked resin is selected in an amount of from about 10 to about 40 percent by weight of the initial latex (i) to form a shell thereover on said formed aggregates, and which shell is of an optional thickness of about 0.2 to about 0.8 micron, and optionally wherein said coagulant is a polymetal halide.

23. A process in accordance with claim 4 wherein said latex contains the same resin as the initial latex of (i), or wherein said added latex contains a substantially dissimilar resin than that of the initial latex.

24. A process in accordance with claim 4 wherein the pH of the mixture resulting in (vi) is increased from about 2 to about 2.6 to about 7 to about 7.5, and wherein said silicate salt dissolved in a base functions primarily as a stabilizer for the aggregates during coalescence (vii), and no or minimal toner particle size increase results, and wherein said coagulant is a polymetal halide.

25. A process in accordance with claim 4 wherein the aggregation (iv) temperature is from about 45° C. to about 60° C., and wherein the coalescence or fusion temperature of (vii) and (viii) is from about 80° C. to about 95° C., and wherein said coagulant is a polyaluminum halide; and optionally, wherein the time of coalescence or fusion is from about 6 to about 12 hours, and wherein the toner resulting possesses a smooth morphology.

26. A process in accordance with claim 1 wherein said second latex contains a resin selected from the group comprised of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylonitrile), and poly(styrene-butyl acrylate-acrylononitrile).

27. A process in accordance with claim 1 wherein said second latex contains a resin of a carboxylic acid selected from the group comprised of acrylic acid, methacrylic acid, itaconic acid, beta carboxy ethyl acrylate, fumaric acid, maleic acid, and cinnamic acid, and wherein said carboxylic acid is selected in an amount of from about 0.1 to about 10 weight percent.

28. A process in accordance with claim 1 wherein said wax dispersion contains a polyethylene wax, a polypropylene wax or mixtures thereof, water, and an anionic surfactant; and wherein said wax is selected in an amount of from about 5 to about 20 weight percent.

29. A process in accordance with claim 1 wherein said acicular magnetite possesses a coercivity of about 250 to about 700 Oe, a particle size of about 0.6 micron in length×0.1 micron in diameter, a coercivity of from about 250 to about 500 Oe, a remanent magnetization (Br) of about 23 to about 39 emu/gram, and a saturation magnetization (Bm) of about 70 to about 90 emu/gram; a coercivity of about 345 Oe, a remanent magnetization (Br) of about 35 emu/gram, and a saturation magnetization (Bm) of about 85 emu/gram; a coercivity of about 370 Oe, a remanent magnetization (Br) of about 33 emu/gram, and a saturation magnetization (Bm) of about 83 emu/gram; a magnetite with a coercivity of about 270 Oe, a remanent magnetization (Br) of about 20 emu/gram, and a saturation magnetization (Bm) of about 79 emu/gram; a coercivity of from about 250 to about 400 Oe, a remanent magnetization (Br) of about 23 to about 55 emu/gram, and a saturation magnetization (Bm) of about 70 to about 90 emu/gram; and wherein said acicular magnetite is present in said toner in an amount of from about 10 to about 40 weight percent; or wherein said acicular magnetite possesses a coercivity of about 250 to about 700 Oe, a particle size of about 0.6 micron in length×0.1 micron in diameter, a magnetite with a coercivity of from about 250 to about 500 Oe, a remanent magnetization (Br) of about 23 to about 39 emu/gram, and a saturation magnetization (Bm) of about 70 to about 90 emu/gram; and wherein said wax is a polyethylene, a polypropylene, or mixtures thereof, and said colorant is carbon black.

30. A process in accordance with claim 1 wherein said first latex contains a crosslinked resin in an amount of from about 2 to about 25 weight percent; and wherein said crosslinked resin possesses a molecular weight $M_w$ of from about 100,000 to about 1,000,000, and an onset glass transition (Tg) temperature of about 48° C. to about 58° C.

31. A process in accordance with claim 1 wherein said crosslinked resin is poly(styrene butylacrylate, beta carboxy ethyl acrylate divinyl benzene).

32. A process in accordance with claim 1 wherein said resin free of crosslinking possesses a molecular weight $M_w$ of about 20,000 to about 500,000, and an onset glass transition (Tg) temperature of from about 45° C. to about 55° C.

33. A toner process comprised of heating a mixture of an acicular magnetite dispersion, a colorant dispersion, a first latex containing a crosslinked resin, and a second latex containing a resin free of crosslinking, in the presence of a coagulant; adding a silicate salt dissolved in a base, and further heating said aggregates to provide coalesced toner particles.

34. A process comprising heating a mixture of magnetite, colorant, a first latex, and a second latex wherein the first latex contains a crosslinked polymer and the second latex is substantially free of a crosslinked polymer, and which heating is accomplished in the presence of a coagulant and a silicate salt base mixture, and wherein said heating comprises a first and second heating, which second heating is at a higher temperature than said first heating, and wherein said first heating is below about the glass transition temperature Tg of said resin free of crosslinking, and said second heating is above about the Tg of said resin free of crosslinking.

* * * * *